US005946836A

United States Patent [19]

Sahebolamri

[11] Patent Number: 5,946,836

[45] Date of Patent: Sep. 7, 1999

[54] VARIABLE DISPLAY DEVICE

[76] Inventor: Ahmad Sahebolamri, 35 Ferne Rachel Road, Thornhill, Ontario, Canada, L4J 6J4

[21] Appl. No.: 08/805,133

[22] Filed: Feb. 24, 1997

[51] Int. Cl.[6] .......... G06F 11/18

[52] U.S. Cl. .......... 40/471; 40/463; 40/465; 40/467; 40/518; 40/560

[58] Field of Search .......... 40/463, 465, 467, 40/471, 518, 560; 348/744

[56] References Cited

U.S. PATENT DOCUMENTS

| | | | |
|---|---|---|---|
| 658,744 | 9/1900 | Weaver | 40/518 |
| 1,067,932 | 7/1913 | Looney | 40/471 |
| 2,163,763 | 6/1939 | Ray | 40/560 X |
| 2,491,184 | 12/1949 | Joss | 352/127 |
| 2,690,697 | 10/1954 | Rocca | 40/560 X |
| 2,696,753 | 12/1954 | Segal et al. | 40/471 X |
| 2,765,552 | 10/1956 | Schlafly | 40/471 X |
| 3,020,798 | 2/1962 | Chrisman | 40/560 X |
| 3,069,970 | 12/1962 | Pierson | 40/560 X |
| 3,198,066 | 8/1965 | McGhee | 40/560 X |
| 4,195,430 | 4/1980 | Suttles | 40/518 |
| 4,739,567 | 4/1988 | Cardin | 40/560 X |
| 5,570,138 | 10/1996 | Baron | 348/744 |

FOREIGN PATENT DOCUMENTS

| | | | |
|---|---|---|---|
| 2430645 | 3/1980 | France | 40/463 |

*Primary Examiner*—Brian K. Green
*Assistant Examiner*—Andrea Chop
*Attorney, Agent, or Firm*—David W. Wong

[57] ABSTRACT

The display device has a free standing structure or it may be incorporated into a building wall. The display device primarily consists of a banner having a series of panels mounted in a plurality of display areas provided in a movable frame. A selected panel may be moved into position of a display frame. Each panel bears a different display. The display frame consists of a generally rectangular frame having a light projection display screen mounted at its rear side. The panels moved over the display screen. One display area is an empty area and does not contain any panel such that when this empty panel is located at the display frame a light display projected onto the screen with a video or slide projector is visible in the display frame.

6 Claims, 2 Drawing Sheets

VARIABLE DISPLAY DEVICE

BACKGROUND OF THE INVENTION

This invention relates to display devices and particularly relates to a variable display device having a plurality of selectable display capabilities.

Display devices such as billboards, posters or shop signs have been widely constructed of a board having the advertisement or display material painted thereon. The board may or may not be provided with a frame and it may be erected on a free standing supporting structure or on a building. Such display device can show only a single message or display; and it is necessary to provide a plurality of such signs in order to show more than one display. A plurality of billboards and signs not only create an unsightly cluster of signs, but would also require a large area for their installation. Moreover, due to the duplication in cost and time in fabrication, they are expensive to produce and erect.

The drawback of painted billboards and signs have been mitigated by the use of a projection screen which is operative to show a plurality of displays, one at a time, on a single screen. Such projection signs are effective in drawing the attention of viewers after dark; however, they are difficult to view when the ambient is bright particularly during daytime. Accordingly, they are practical in displaying the information, at most, only half of a day and are thus not cost effective.

SUMMARY OF THE INVENTION

It is the principal object of the present invention to provide a display device which is effective in showing displays both in the day time as well as after dark.

It is another object of the present invention to provide a display device which is operative to show a selected display at all ambient light conditions.

It is another object of the present invention to provide a display device which is capable of showing a large variety of display panels.

It is another object of the present invention to provide a display device having a simple construction.

Briefly, the display device of the present invention comprises a display frame member having a front opening and a rear opening, two slot openings formed in two opposite sides therein. A display screen member is mounted at the rear opening. An elongated movable banner member is inserted through the display frame member and is operative to pass therethrough from the two slot openings. The movable banner member comprises a plurality of display panels in which each panel is selectively locatable in said display frame member whereby the panel is visible through the front opening. An empty display area is formed in the movable banner member whereby when the empty display area is located within the display frame member the display screen is visible through the front opening therein. A light projection display member is positioned behind the display screen and is adapted to project a light image on the display frame member when the empty display area is located at the display frame member.

BRIEF DESCRIPTION OF THE DRAWINGS

Other objects and advantages of the present invention will become apparent from the following detailed description of the preferred embodiments thereof in connection with the accompanying drawings, in which.

DETAILED DESCRIPTION OF THE PREFERRED EMBODIMENTS

Figure 2:
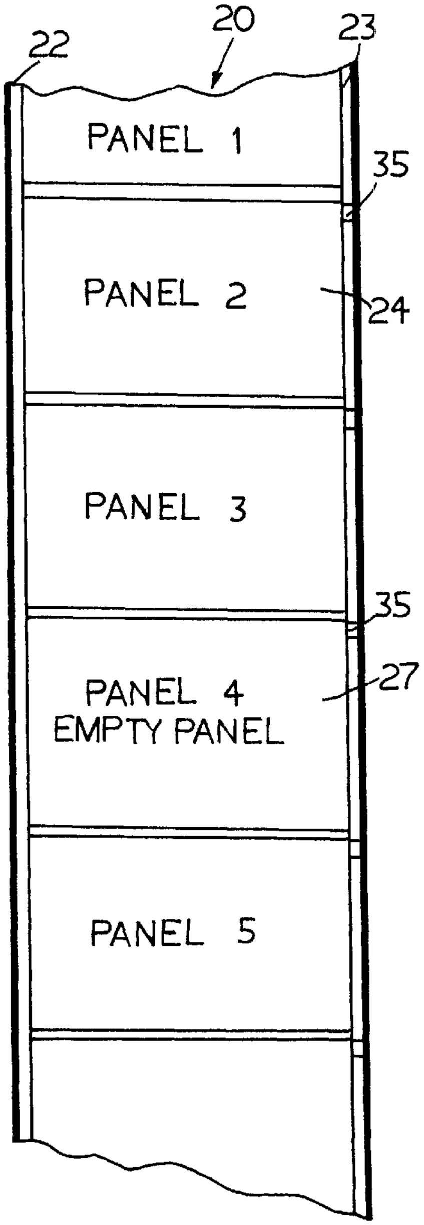
FIG. 2 is a front perspective elevation view of the display frame of the display device according to the present invention.

With reference to the drawings in which like numerals in the various views designate corresponding parts, the display device 10 of the present invention generally consists of a display frame 11 having a rectangular frame structure. The display frame 11 has closed side walls 12 and 13, a front opening 14 which may be covered with a transparent cover 15 made of plexiglass or pane glass to provide weather-proof to the interior of the display frame 11. A top slot opening 16 is formed in the top cover 17 and a bottom slot opening 18 is formed in the bottom cover 19 such that an elongated movable banner 20 may pass through the display frame 11 by inserting through the top slot opening 16 and the bottom slot opening 18. A display screen 21 is mounted at the rear of the display frame 11. The movable banner 20 consists of two elongated parallel belts or chains 22 and 23 having a plurality of display panels 24 mounted on a plurality of display areas. The display panels 24 are made of a flexible web material or plastic film material having the display information provided thereon by painting or similar well known methods on their front surface. The dimension of the front surface of the display panels 24 is equal to the dimension of the front opening 14 of the display frame 11 such that a display panel 24 may be moved to the position within the display frame 11 in registry with the front opening 14 to show the display information through the display frame. Two substantially U-shaped tracks 25 and 26 are respectively provided on the inside surface of the side walls 12 and 13 of the display frame 11 for guiding the banner 20 in sliding through the display frame 11. At least one of the display area 27 is a clear or empty panel without any display material provided thereon. When this empty display area 27 is located in registry with the display frame 11, the display screen 21 will be visible through the front opening of the display frame 11.

Figure 1:
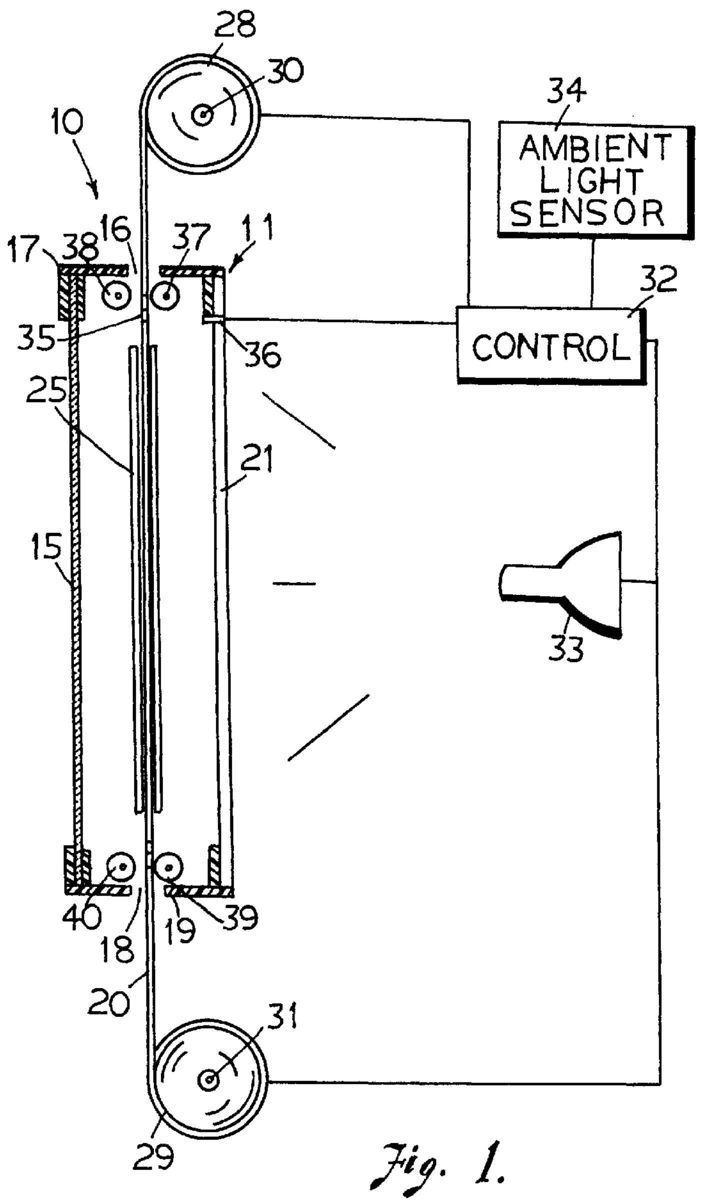
FIG. 1 is a partial cross sectional schematic diagram showing the general construction of the display device of the present invention.
Figure 3:
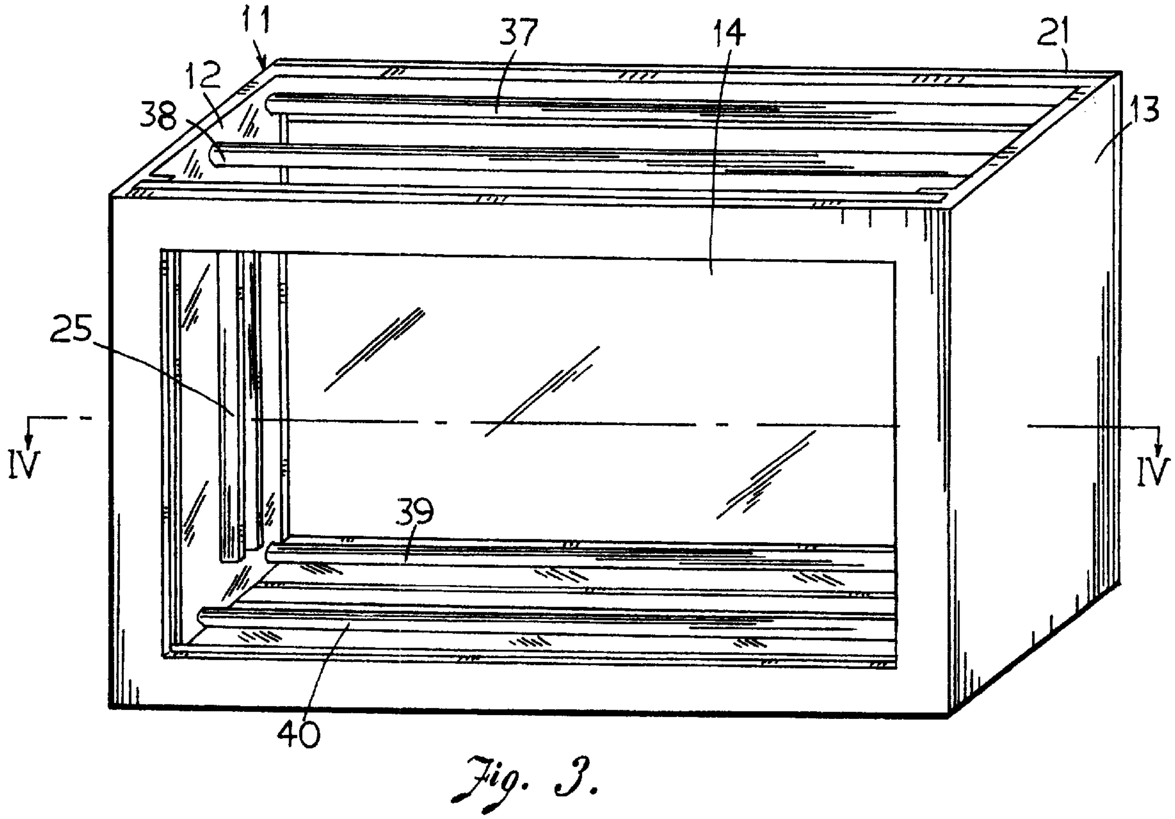
FIG. 3 is a front perspective elevation view of the display frame of the display device according to the present invention with the top cover removed.
Figure 4:
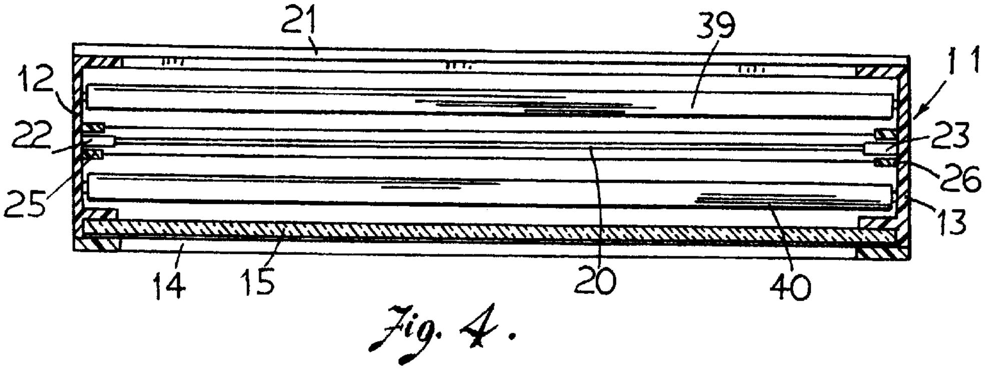
FIG. 4 is a top elevation cross section view of the display frame along the cross section line IV—IV in FIG. 3 with the addition of the banner therein.

The banner 20 is wound between two reels 28 and 29 which are mounted on rotating shafts 30 and 31 respectively. The rotating shafts 30 and 31 are connected to electric motor means which are operative by a control device 32 to move a selected display panel 24 or the empty panel 27 into position within the display frame 11 for showing the selected information or sign. Alternatively, the rotating shafts 30 and 31 may be coupled by a mechanical linkage to at least one motor means which is operative to rotate the two reels 28 and 29 in synchronization to move a selected display panel into position within the display frame 11. When the empty display area 27 is located at the display frame 11, the display screen 21 is visible, and a display image may then be projected onto the display screen 21 by a video or slide projector means 33 located in a spaced manner from either the rear or the front of the display frame 11, and which may also be controlled by the control means 32. The display screen 21 is particularly effective for displaying the information or sign at night or when the ambient light condition is low. The control means 32 may be provided with an ambient light sensing means 34 which would automatically move the empty panel 27 into position in the display frame 11 when the ambient light condition is below a predetermined level and also to turn on the video or slide projector means 33 so as to display the projected image on the screen 21 under such light condition. A reflective means 35 may be provided at each display panel such as at the supporting belt 23 as shown in FIG. 2, which cooperates with a position sensor 36 located at the rear wall of the display frame 11 as best shown schematically in FIG. 1, to provide a control signal to the control 32 for locating the selected display panel properly within the display frame and in registry with the front opening 14. It can be appreciated by those skilled in the art that other feed back means such as a mechanical latching arm provided on the display frame and position locating slots formed on the supporting belt 23 may be provided for the same purpose.

During the day time the control means 32 may be operated to move a selected panel 24 or to move the panels 24 serially one after the other at selected intervals to position in the display frame 11 so as to display a selected information or sign, or to display the information and signs in a serial manner, one at a time.

A pair of roller bars 37 and 38 may be provided in the display frame adjacent to the top slot opening 16, and similarly roller bars 39 and 40 may be provided adjacent to the bottom slot opening 18 in order to enhance the smooth operation of the movable banner 20 in passing through the display frame 11.

The two holding reels 28 and 29 may be located on the same side of the display frame 11 such that one drive motor means may be utilized to simplify the driving mechanism of these reels. In such case, the banner 20 would enter and exit from only one side of the frame 11, and two empty panels would be provided so that the display screen 21 would be visible when the two empty panels are positioned side-by-side in registry with the front opening 14.

The entire device may be enclosed in a housing which may be supported by a free standing structure or mounted on a building.

Various modifications can be made without departing from the spirit of this invention or the scope of the appended claims. The construction set forth in this disclosure is given as an example and is in no way final or binding. In view of the above, it will be seen that several objects of the invention are achieved and other advantages are obtained. For example, the display panels 20 may pass through the display frame sideways rather than in a vertical manner. As many changes could be made in the above construction and method without departing from the scope of the invention, it is intended that all matter contained in the above description shall be interpreted as illustrative and not in a limiting sense.

What I claim is:

1. A display device comprising:

a display frame member having a front opening and a rear opening, a display screen member fixedly mounted at said rear opening and also forming a rear cover for said display frame member at said rear opening, a transparent sheet member mounted at said front opening of said display frame member and forming a transparent front cover for said display frame member at said front opening, an elongated movable banner member inserted through said display frame member and passing therethrough, said movable banner member comprising a plurality of display panels mounted on two elongated mutually parallel belts, each panel of said display panels being selectively locatable in said display frame member whereby said panel is selectively positioned in registry with said front opening, said movable banner member including at least one empty area without a display panel located therein whereby when said empty area is selectively located within said display frame member and positioned in registry with said front opening, said display screen member is visible through said front opening of said display frame member, a light projection display member positioned in a spaced manner from said display screen member and adapted to project a light image on said display screen member when said empty area is located in registry with said front opening.

2. A display device according to claim 1 wherein said movable banner member is mounted on two reels located juxtaposed to said display frame member and said reels have drive shafts coupled to at least one drive motor.

3. A display device according to claim 2 including a control device connected to said drive motor and adapted to move said movable banner member through said display frame member whereby said display panels are selectively visible through said front opening of said display frame member.

4. A display device according to claim 3 including an ambient light sensing device provided at said control device and adapted to position said empty area of said movable banner member in registry with said front opening whereby said display screen is visible through said front opening when the ambient light condition around said display frame member is below a predetermined level.

5. A display device according to claim 4 wherein said control device is connected also to said light projection display member and adapted to actuate said light projection display member to project a display image onto said display screen when said empty area is positioned in registry with said front opening.

6. A display device according to claim 5 wherein said display frame member has a top cover and a bottom cover, and a top slot opening is formed in said top cover and a bottom slot opening is formed in said bottom cover, and said movable banner member passes through said display frame member through said top slot opening and said bottom slot opening.

* * * * *